March 17, 1931.  K. STROBEL  1,796,969
CONTROLLING ELECTRIC ARCS
Filed June 3, 1929
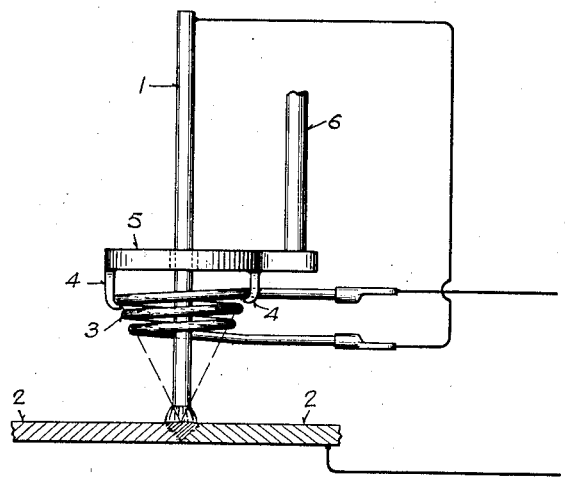
INVENTOR.
Karl Strobel
BY
ATTORNEY.

Patented Mar. 17, 1931

1,796,960

UNITED STATES PATENT OFFICE

KARL STROBEL, OF MILWAUKEE, WISCONSIN, ASSIGNOR TO A. O. SMITH CORPORATION, OF MILWAUKEE, WISCONSIN, A CORPORATION OF NEW YORK

CONTROLLING ELECTRIC ARCS

Application filed June 3, 1929. Serial No. 368,086.

This invention relates to a method of controlling and stabilizing an electric arc.

The invention is particularly applicable to electric arcs employed in the welding and fusing of metals wherein an electric arc is established between a fusible metallic weldrod and the parts to be welded and the metal from the rod is projected through said arc and integrally united with the parts to be welded.

One of the objects of the invention is to increase the penetrating power of the arc so that the same may fuse the parts to be welded to depths greater than have heretofore been obtainable.

Another object of the invention is to stabilize and control the arc so as to cause the metal being deposited thereby to be projected onto the parts to be welded in a steady stream of minute particles.

A further object of the invention is to conserve the electrical energy employed for establishing and maintaining the arc by reducing the amount of heat loss through dissipation of the heat interiorly of the article being welded.

A further object of the invention is to obtain a weld having a uniform structure and having other desirable commercial qualities.

Having these and other objects in view, the invention resides in an improvement in controlling an electric arc by surrounding the same with a magnetic coil wherein the magnetic field of force resulting therefrom is utilized to desirably control and stabilize the arc.

The invention is best understood by referring to the accompanying drawings in which the invention is shown as applied to the art of arc welding.

In the illustration, the numeral 1 indicates a weldrod which may be composed of fusible metallic material or of non-fusible electro-conductive material such as carbon. The weldrod is connected to one terminal of a source of welding energy and the parts 2 to be welded are connected to the other terminal of the source of welding energy as is well understood in the industry.

Concentric to the weldrod and spaced a suitable distance from the same is a tapered coil 3 of suitable electro-conductive material which coil is supported in any suitable manner such as by the fingers 4 depending from a ring 5 which is in turn supported by a suitable supporting post 6. The coil is preferably tapered and may include any suitable number of turns about the weldrod. The taper is preferably so proportioned and the coil so positioned with respect to the weldrod that the apex of the taper will be somewhere adjacent the center of the arc as is shown by the dotted lines in the figure. The coil is preferably connected to the welding circuit and in series with the arc.

The results obtained from the coil when shaped and positioned as above set forth indicate that the coil sets up desirable magnetic conditions around the arc so as to cause the same to penetrate into the parts being welded to a degree much greater than would otherwise be possible by employing electrodes having the same current densities. The magnetic field surrounding the arc tends to stabilize the same and to cause the metal from the weldrod to be projected in a steady stream of minute particles upon the parts being united. By tapering the coil as shown, results indicate that the most desirable magnetic conditions and a better control and stabilization of the arc may be effected when the arc is near the apex of the taper, although it is understood that the position of the apex may be varied to a considerable degree without departing from the spirit of the invention.

While the invention readily lends itself to the art of arc welding, it may well be applied to stabilizing and controlling other arcs, such as those used in electric furnaces and arc lamps.

Having thus described the invention, what is desired to be secured by Letters Patent is:

1. In an apparatus for controlling an electric arc, a pair of spaced electrodes in arcing relation to each other, a tapered coil concentric to and spaced from one of said electrodes, the apex of the taper being substantially at the center of the arc, and means for passing an electric current through said coil.

2. In an apparatus for electric arc welding, a fusible metallic weldrod in arcing relation to the parts to be welded, a tapered coil encircling said weldrod and positioned to have its apex at the arc, and means connecting the coil in series with the arc.

In witness whereof I have signed my name at Milwaukee, Wisconsin, this 29th day of May, 1929.

KARL STROBEL.